TRANSMITTED SIGNAL TWO TONE DIFFERENCE CONTROLLED SINGLE SIDEBAND SQUELCH AND AVC SYSTEM

Filed Jan. 4, 1965

INVENTOR.
SAMUEL L. BROADHEAD JR.

BY Moody and Kintzinger

ATTORNEYS

United States Patent Office 3,320,535

Patented May 16, 1967

3,320,535

TRANSMITTED SIGNAL TWO TONE DIFFERENCE CONTROLLED SINGLE SIDEBAND SQUELCH AND AVC SYSTEM

Samuel L. Broadhead, Jr., Cedar Rapids, Iowa, assignor to Collins Radio Company, Cedar Rapids, Iowa, a corporation of Iowa Filed Jan. 4, 1965, Ser. No. 423,160
8 Claims. (Cl. 325—49)

ABSTRACT OF THE DISCLOSURE

A radio frequency single sideband system utilizing a two frequency tone and frequency difference tone signal transmission for developing a control voltage in the receiver useful for squelch and/or automatic volume control. An IF amplifier in the receiver of the system has an output connection to both a sideband detector, that has audio circuit output connection, and a detector for detecting the two frequency tones. The output of the two tone detector is passed to a filter passing only a tone equal to the difference between the two tones for developing the desired control voltage for squelch and/or automatic volume control.

Figure 1:
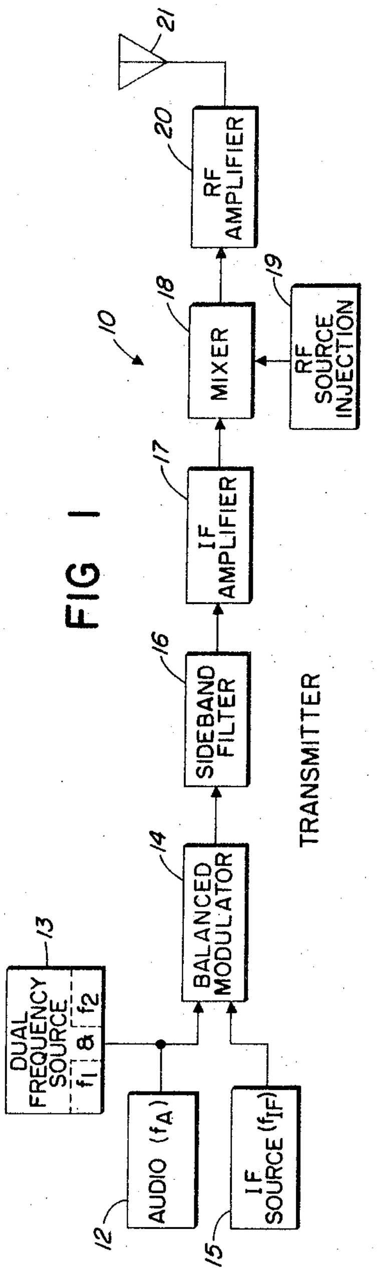

This invention relates in general to radio system squelch and AVC systems, and, in particular, to a two frequency and frequency difference tone transmitted and received single sideband squelch and automatic volume control (AVC) system.

There are various existing SSB squelch and AVC systems, however, those operating only on information contained in a conventionally transmitted SSB signal have not proven to provide very dependable operation particularly with an absence of any constant reference in a transmitted signal. With such SSB squelch and AVC systems it has been found that certain types of noise at times show sufficient similarity to the SSB signal as to result in undesired squelch and AVC activation. Furthermore, the normal voice SSB system is inherently of such an intermittent nature as to necessitate long decay time to an undesirable degree in the receiver.

While a single tone frequency, that may be the carrier frequency, may be transmitted the receiver bandwidth for passing such a single tone must include possible frequency difference between SSB transmitter and receiver. This results in greatly increased transmitted power requirements in order to obtain reception reliability required. For example, in one SSB transmitting and receiving system the specified frequency accuracy for a 70 mc. signal is plus or minus 35 c.p.s. (0.5 p.p.m.) a tolerance on the transmitter and the receiver that could result in a possible total frequency variance of as much as 70 c.p.s. between the transmitter and receiver. This requires an operational bandwith of at least 70 c.p.s. for such a single tone operated squelch and AVC system even assuming that the tone is generated at the transmitter with absolute accuracy. Further, with such tone operated squelch and AVC systems, in order to insure opening of squelch when there is an intelligibly receivable voice signal, the signal to noise ratio as related to the squelch controlling tone should be at least 10 db better than the ratio for the voice signal. Generally, noise power is proportional to bandwidth, with normal random noise distribution and in relation to bandwidths being considered here, and that therefore the noise ratio of a 3500 c.p.s. bandwidth to a 70 c.p.s. bandwidth would be $$10 \log_{10}(350/7) = 10 \log_{10}50 = 17 \text{ db}$$

With this system, in order to obtain a 10 db better signal to noise ratio with respect to such a single controlling tone, the tone could not be transmitted less than 7 db below the voice signal. Even with tone power at the maximum 7 db below the voice signal the tone power would be, at best, about 20% of peak voice power, a tone power requirement actually quite wasteful of transmitted power.

It is, therefore, a principal object of this invention to provide an improved system in SSB radio systems for developing a reliable continuous control voltage that may be used for control of squelch and/or AVC operation.

Another object is to provide a SSB radio system squelch and/or AVC control system imposing minimum transmitter power requirements.

A further object is to provide a SSB radio squelch and/or AVC system having fast acting characteristics independent from relatively long decay time circuit constant operational perimeters inherent with various other SSB signal controlled squelch and AVC systems.

The features of this invention useful in accomplishing the above objects in a squelch and/or AVC system (or AGC system) include, the transmission of two tones with control voltage developed by the difference tone between the two transmitted tones. The tone difference generally is independent of transmitter and receiver differences in frequencies and depends substantially only upon the accuracy of the two tone frequency generation at the transmitter. The tone difference between the two frequencies can be made very accurate since when properly designed both the tone generators will generally vary very nearly the same in response to temperature changes and other factors that may, from time to time, cause a tone generator to vary in frequency. Assuming, for example, that the required bandwidth for the difference frequency tone of the two tones is 10 c.p.s. then, referring back to the previous 3500 c.p.s. bandwidth $$10 \log_{10} \times 3500/10 = 26 \text{ db}$$

a quite advantageous db difference. Transmission of the two frequency tones 16 db down from voice would give the required 10 db advantage for squelch operation and 16 db down is only about 2.5% of peak voice power a quite negligible power factor. Actually, random noise picked up by the microphone generally causes transmission of much more power than is required for operation of this improved squelch and AVC control system. The tones generated and transmitted could be, for example, an $f1$ of 4150 c.p.s. and an $f2$ of 4000 c.p.s. with an $f1-f2=150$ c.p.s. and with these frequencies within the detected audio bandwidth without the transmitted power level of the frequency resulting in tones in the audio output at such power level as to be unduly annoying. However, such squelch and/or AVC controlling tones may be quite easily eliminated from the audio output, and are, in a working embodiment, by the use of an audio band passing filter, passing audio, for example, from approximately 300 c.p.s. to 3500 c.p.s. The controlling frequency tones are transmitted continuously during message transmission and thereby provide a continuous AVC reference in addition to squelch operation. It should be noted that this dual frequency tone and tone difference actuated squelch has an important advantage over various other SSB signal actuated squelch systems in that the receiver squelch is not opened by transmission from a transmitter not equipped for generating the dual frequency tone signals used for operating the squelch system. This is particularly advantageous where, for example, two radio sets are used for automatic relaying where squelch operation on the receiving radio set keys the other radio set to transmit thereby automatically relaying transmitted messages.

Figure 2:
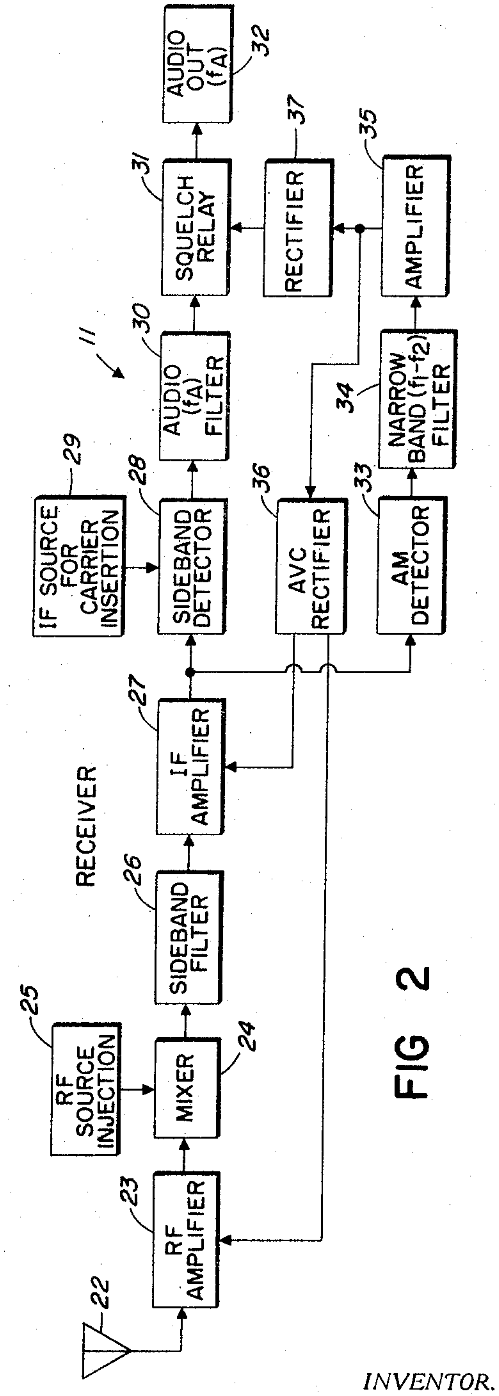

A specific embodiment representing what is presently regarded as the best mode of carrying out the invention is illustrated in the accompanying drawing:

In the drawing:

FIGURE 1 represents a block diagram of a radio transmitter equipped for generation of the two frequency tones and thereby the frequency tone difference signal transmission useful in applicant's SSB squelch and AVC system; and FIGURE 2 a block diagram of a SSB receiver equipped with squelch and AVC circuitry activated by and controlled by the received two tone difference signal transmitted by the transmitter of FIGURE 1.

Referring to the drawing:

The radio transmitter 10 of FIGURE 1 and the radio receiver 11 of FIGURE 2 are components of a SSB radio system equipped for a transmitted 2 tone frequency difference signal controlled SSB squelch and/or AVC system. In the transmitter of FIGURE 1 an audio frequency ($f_A$) source 12 and a dual frequency source 13 with frequency tone generators $f_1$ and $f_2$ are connected for feeding the audio $f_A$ and two tone $f_1$ and $f_2$ inputs to the balanced modulator 14. An intermediate frequency source 15 also provides an input ($f_{IF}$) to the balanced modulator 14. The output on the balanced modulator 14 is applied through a sideband filter 16, and on through IF amplifier 17 to a mixer 18 which receives an additional input from an RF injection frequency source 19. The output of mixer 18 is applied through an RF amplifier 20 to an antenna 21 for transmitting SSB signals received in turn by antenna 22 of the SSB receiver 11 of FIGURE 2.

The received signal sensed by the antenna 22 of SSB radio receiver 11 is applied as the SSB radio frequency input signal to RF amplifier 23. The output of RF amplifier 23 is applied to mixer 24 which is supplied with an additional reference frequency signal injection from RF frequency source 25. The resulting output of mixer 24 is applied through sideband filter 26 to an IF amplifier 27. The output of IF amplifier 27 is applied to a sideband detector 28 which also receives a frequency carrier insertion from IF carrier source 29 for developing an audio output successively applied through audio filter 30 and squelch relay 31 to audio output utilizing circuitry and/or components 32. The output of IF amplifier 27 is also applied as an input to audio modulated detector 33 the output of which is passed through a narrow band filter 34 designed for passing the tone difference frequency ($f_1-f_2$) of the two tones $f_1$ and $f_2$ to amplifier 35. The A.C. output of amplifier 35 is applied as an input to AVC rectifier 36 which develops a D.C. output voltage, with magnitude a function of the amplitude of the A.C. signal out of amplifier 35, applied as an AVC controlling voltage to RF amplifier 23 and IF amplifier 27. The output of amplifier 35 is also applied to rectifier 37 which develops a D.C. output voltage, with magnitude a function of the amplitude of the A.C. signal out of amplifier 35, as a D.C. control voltage for the squelch relay 31 (squelch device 31 could be a bias controlled solid state device).

In a working embodiment of the invention designed for an intermediate frequency ($f_{IF}$) of 4.5 mc. an audio frequency filter 30 was utilized having an audio frequency pass band $f_A$ of from approximately 300 c.p.s. to approximately 3500 c.p.s. Other frequency tone input $f_1$ was 4150 c.p.s. and a frequency tone $f_2$ of 4000 c.p.s. was utilized with the resulting frequency tone difference $f_1-f_2$ equal to 150 c.p.s. With this combination of tone frequencies, audio passed by filter 30 would not contain either of the tones $f_1$ or $f_2$ nor any tone difference frequency. The 150 c.p.s. tone frequency difference between the tone frequency $f_1$ and $f_2$ is detected by audio modulation detector 33 and passed through a narrow band (or low pass) filter 34 particularly designed for passing a frequency equal to the difference between the two tone frequency $f_1$ and $f_2$. Thus, a SSB squelch and AVC system is provided capable of developing reliable, repeatable, continuous control voltages, useful for both the squelch and the AVC circuits, that imposes a requirement for a minimum of the total transmitted signal power for operation. Furthermore, it is a system providing fast acting squelch and AVC independent from relatively long decay time circuit constant operational requirements inherent with other SSB squelch and AVC systems. Further, it is a receiver squelch not opened by transmission from a transmitter not equipped for generating such a dual tone frequency difference controlling signal.

Whereas this invention is here illustrated and described with respect to a specific embodiment thereof, it should be realized that various changes may be made without departing from the essential contributions to the art made by the teachings hereof.

I claim:

1. In a radio frequency single sideband transmitting and receiving system utilizing a two frequency tone and frequency difference tone signal transmission for developing a control voltage in the receiver useful for a squelch and/or automatic volume control, including: a single sideband transmitter having an audio input source and an IF frequency source input to a balanced modulator and, in addition, two frequency tone inputs from a dual frequency tone signal source to the balanced modulator; and including RF output signal radiating antenna means; a single sideband receiver including a radiated RF signal receiving antenna; an IF amplifier section providing an output to a sideband detector; IF signal source carrier insertion means for said sideband detector connected to provide an output to audio output circuit means; said IF amplifier also connected for providing an output to an AM detector; the output of said AM detector being connected to a filter capable of passing a frequency tone equal to the difference between the two tone frequencies applied as inputs to the balanced modulator of said transmitter; and means for utilizing the output of said filter as a control voltage for said receiver.

2. The radio frequency single sideband transmitting and receiving system of claim 1, wherein said means for utilizing the output of said filter as a control voltage of said receiver includes rectifying means capable of providing D.C. rectified outputs, the D.C. output levels of which are a function of the power level of the output of said filter.

3. The radio frequency single sideband transmitting and receiving system of claim 2, wherein said rectifying means includes a rectifier providing a D.C. rectified AVC output voltage applied to a squelch device in said audio output circuit means.

4. The radio frequency single sideband transmitting and receiving system of claim 3, wherein said rectifying means also includes an AVC rectifier developing D.C. output voltages connected as AVC voltages in radio frequency amplifying means of the RF single sideband receiver.

5. The radio frequency single sideband transmitting and receiving system of claim 2, wherein said rectifying means also includes a rectifier providing D.C. rectified AVC output voltages connected as AVC voltages in radio frequency amplifying means of the RF single sideband receiver.

6. The radio frequency single sideband transmitting and receiving system of claim 1, wherein said audio output circuit means includes an audio bandpass filter having an audio frequency bandpass range below the lowest frequency of said two frequency tones, and above a frequency equal to a difference between the two frequency tones.

7. In a radio frequency single sideband receiver capable of responding to a predetermined frequency difference tone signal equal to the difference between two received frequency tones modulated on a received radio frequency single sideband transmission for developing a control voltage in the receiver useful for a squelch and/or automatic volume control, including: in the single sideband RF receiver a radiated RF signal receiving antenna; an IF amplifier section providing an output to a sideband detector; IF signal source carrier insertion means for said sideband detector; said sideband detector connected to provide an output to utilizing circuit means; said IF amplifier also connected for providing an output to an AM detector; the output of said AM detector being connected to a filter passing said predetermined frequency difference tone equal to the difference between said two received frequency tones; and means for utilizing the output of said filter as a control voltage for said receiver.

8. The radio frequency single sideband receiver of claim 7, wherein said output utilizing circuit means is audio output circuit means including an audio bandpass filter having an audio frequency bandpass range with the highest frequency passed being below the lower frequency of said two frequency tones, and with the lowest frequency passed by said audio bandpass filter being above a frequency equal to a difference between the two frequency tones.

References Cited by the Examiner

UNITED STATES PATENTS

| | | | |
|---|---|---|---|
| 2,527,561 | 10/1950 | Mayle | 325—392 X |
| 2,530,614 | 11/1950 | Hugenholtz | 325—329 |
| 3,182,259 | 5/1965 | Halder | 325—50 |
| 3,204,045 | 8/1965 | Tuthill | 179—41 |

JOHN W. CALDWELL, *Acting Primary Examiner.*

B. V. SAFOUREK, *Assistant Examiner.*